US 6,484,839 B2

(12) United States Patent
Cole

(10) Patent No.: US 6,484,839 B2
(45) Date of Patent: Nov. 26, 2002

(54) STEER-BY-WIRE ROTARY ACTUATOR

(75) Inventor: Michael James Cole, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/728,258

(22) Filed: Dec. 1, 2000

(65) Prior Publication Data

US 2002/0066614 A1 Jun. 6, 2002

(51) Int. Cl.⁷ .................................................. B62D 5/04
(52) U.S. Cl. ....................................... 180/402; 180/406
(58) Field of Search ................................ 180/402, 403, 180/443, 444, 406

(56) References Cited

U.S. PATENT DOCUMENTS

| | | | | |
|---|---|---|---|---|
| 4,741,409 A | * | 5/1988 | Westercamp et al. | 180/79.1 |
| 4,880,074 A | * | 11/1989 | Matsumoto | 180/142 |
| 5,267,625 A | * | 12/1993 | Shimizu | 180/79.1 |
| 6,095,277 A | * | 8/2000 | Bohner et al. | 180/403 |
| 6,102,150 A | * | 8/2000 | Bohner et al. | 180/403 |
| 6,176,341 B1 | * | 1/2001 | Ansari | 180/402 |
| 6,213,248 B1 | * | 4/2001 | Kawaguchi et al. | 180/446 |
| 6,279,675 B1 | * | 8/2001 | Bohner et al. | 180/403 |
| 6,283,243 B1 | * | 9/2001 | Bohner et al. | 180/406 |
| 6,336,519 B1 | * | 1/2002 | Bohner et al. | 180/403 |
| 6,345,681 B1 | * | 2/2002 | Hackl et al. | 180/402 |
| 6,354,393 B1 | * | 3/2002 | Ahlert et al. | 180/403 |
| 6,367,575 B1 | * | 4/2002 | Bohner et al. | 180/403 |

* cited by examiner

Primary Examiner—Avraham Lerner
(74) Attorney, Agent, or Firm—Edmond P. Anderson

(57) ABSTRACT

A steer-by-wire steering system for steering a set of road wheels is disclosed. The system comprises a controller and at least one actuator assembly connected to the controller and to the at least one wheel of the set of road wheels. The at least one actuator assembly comprises an electro-mechanical actuator connected to the controller, a crank arm connected to the electro-mechanical actuator, a steering arm connected to the at least one wheel of the set of road wheels; and a tie rod having a first end thereof connected to the crank arm and a second end thereof connected to the steering arm. The electro-mechanical actuator, in response to a signal from the controller, is operative to rotate the crank arm producing thereby a force acting through the tie rod so as to rotate the steering arm and the at least one road wheel to a desired position. The steer-by-wire steering system includes a backup system capable of assuming operative command of the steer-by-wire steering system.

18 Claims, 4 Drawing Sheets

STEER-BY-WIRE ROTARY ACTUATOR

TECHNICAL FIELD

This invention relates to a steer-by-wire rotary actuator.

SUMMARY OF THE INVENTION

A steer-by-wire steering system for steering a set of road wheels is disclosed. The system comprises a controller and at least one actuator assembly connected to the controller and to the at least one wheel of the set of road wheels. The at least one actuator assembly comprises an electro-mechanical actuator connected to the controller, a crank arm connected to the electro-mechanical actuator, a steering arm connected to the at least one wheel of the set of road wheels; and a tie rod having a first end thereof connected to the crank arm and a second end thereof connected to the steering arm. The electro-mechanical actuator, in response to a signal from the controller, is operative to rotate the crank arm producing thereby a force acting through the tie rod so as to rotate the steering arm and the at least one road wheel to a desired position. The steer-by-wire steering system includes a backup system capable of assuming operative command of the steer-by-wire steering system.

DESCRIPTION OF THE PREFERRED EMBODIMENT

Figure 1:
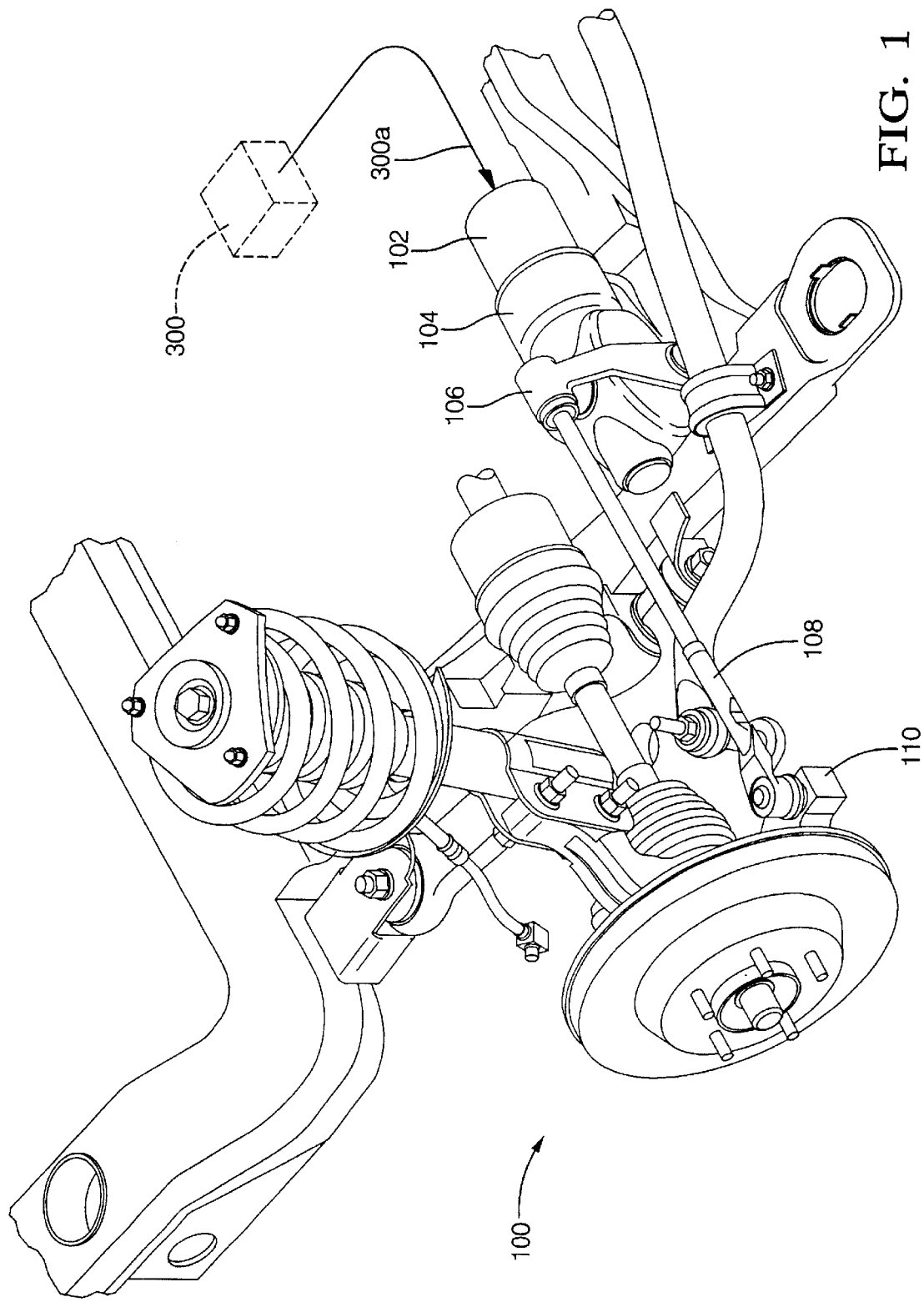
FIG. 1 is a generalized schematic representation of the steer-by-wire steering system.
Figure 2:
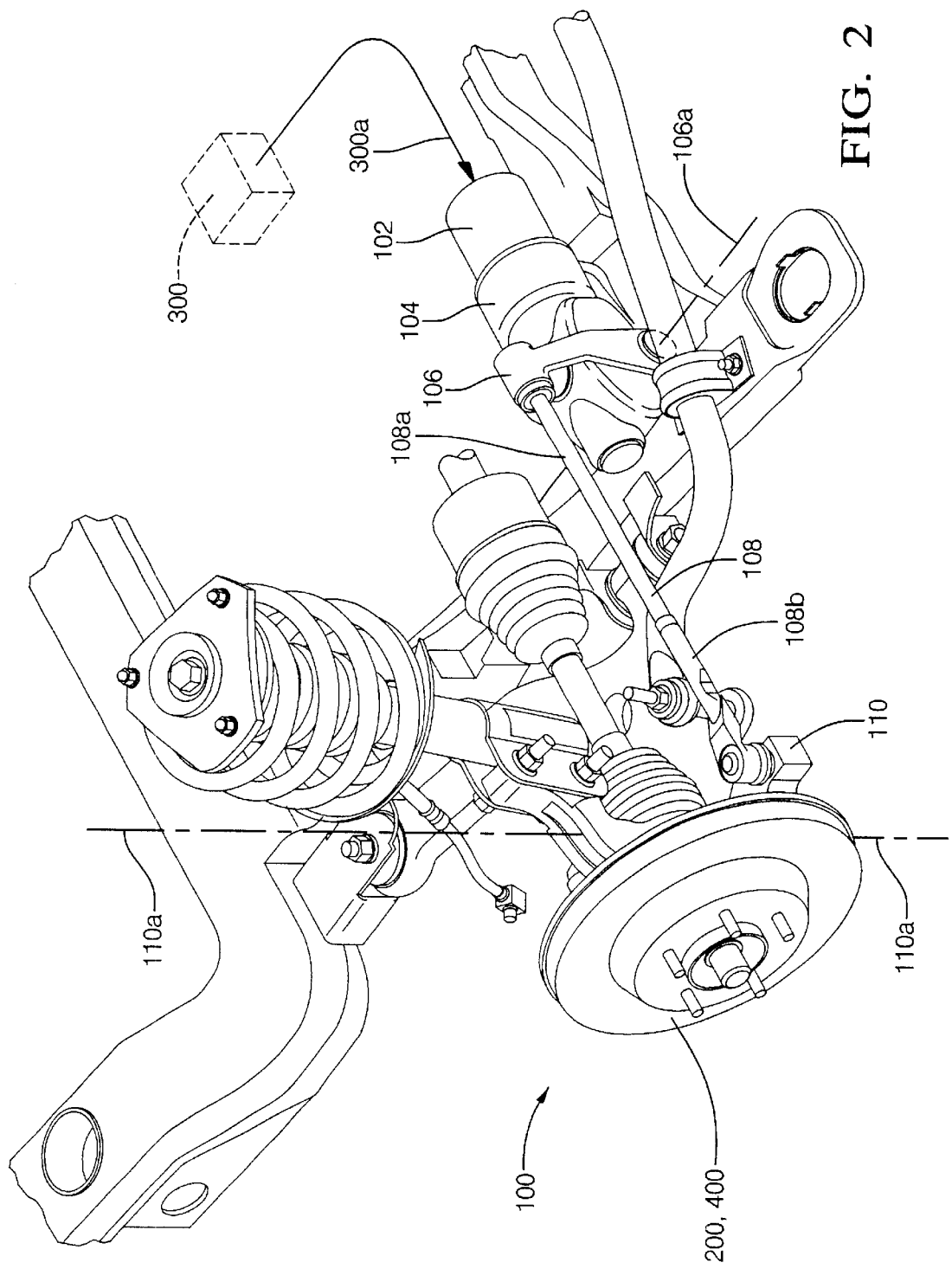
FIG. 2 is a generalized schematic representation of an actuator assembly of the steer-by-wire steering system.
Figure 3:
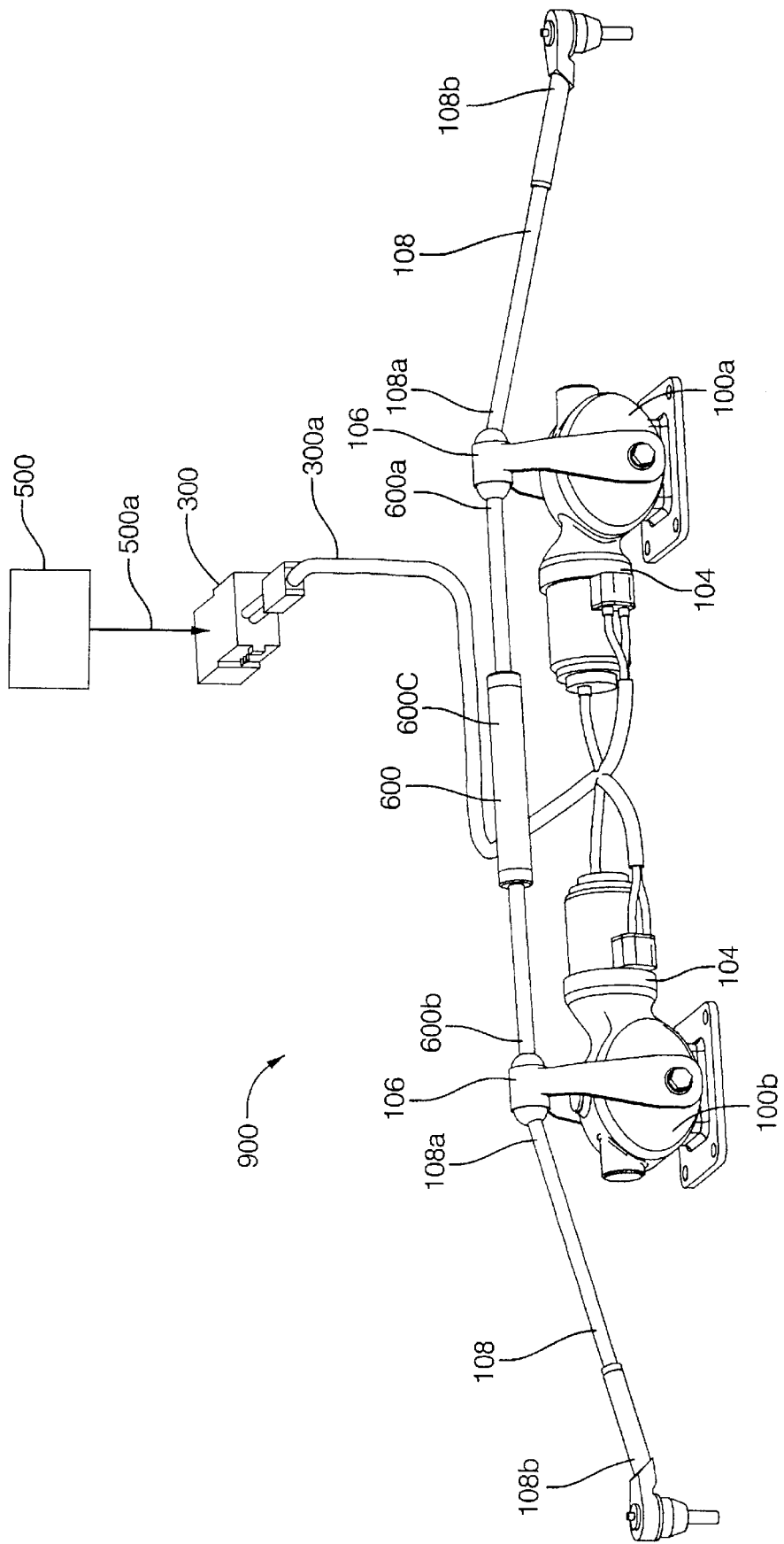
FIG. 3 is a generalized schematic representation of a first and second actuator assembly of FIG. 2 connected by a cross link apparatus.
Figure 4:
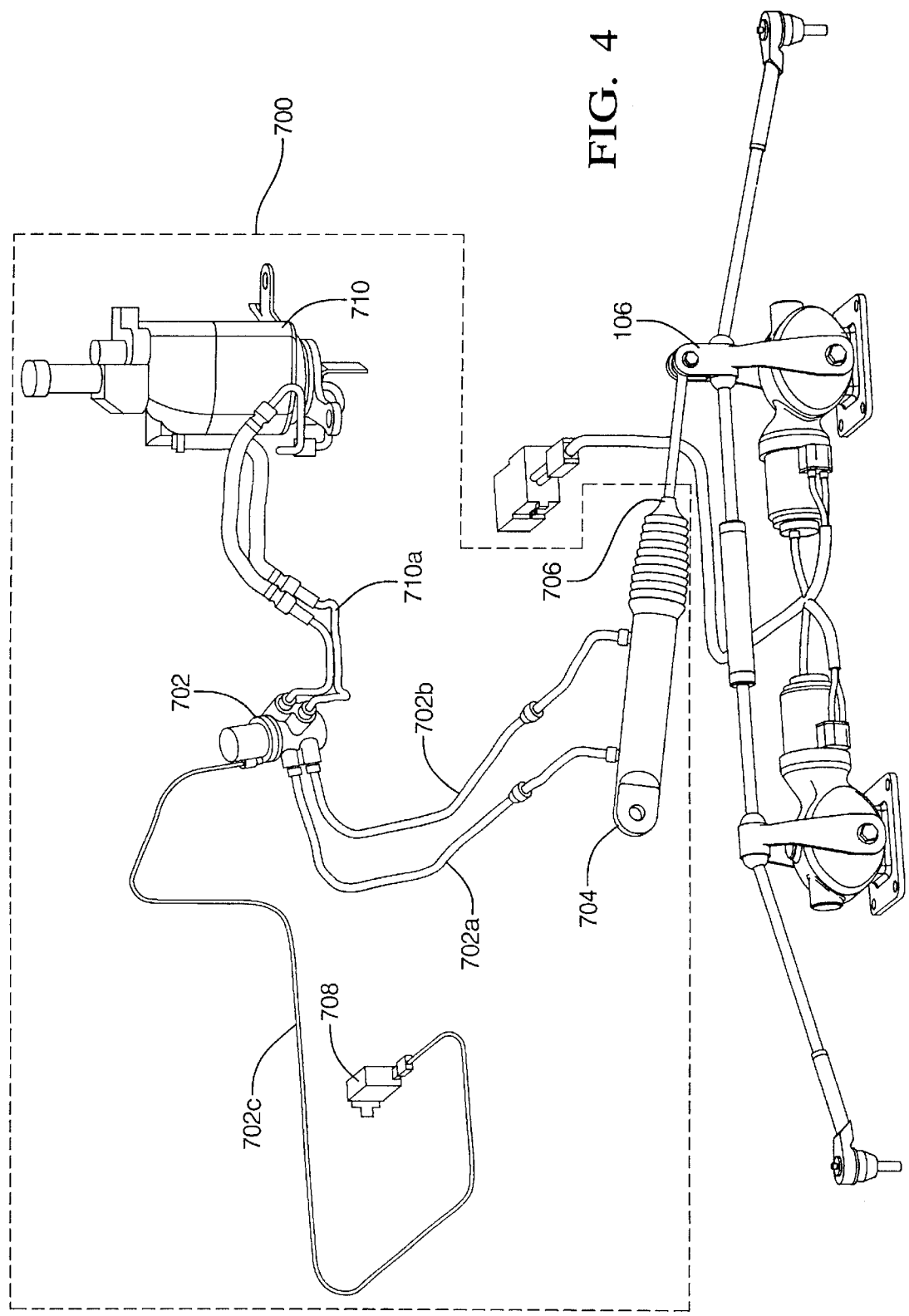
FIG. 4 is a generalized schematic representation of the back-up system of FIG. 2.

A description of the preferred embodiment of the present invention will now be had, by way of exemplification and not limitation, with reference to FIGS. 1, 2, 3 and 4 of the drawing. FIG. 1 is a generalized schematic representation of a steer-by-wire steering system 900 comprising a controller 300 and an actuator assembly 100 in communication therewith by a steering signal designated by the reference numeral controller 300a. The controller 300 is subject to commands from an external motive source such as a driver 500. Such commands are designated by the reference numeral 500a. The actuator assembly 100 is mechanically connected by a steering arm 110 to a first road wheel 200 and operative, subject to commands of the controller 300, to adjust the position of the first road wheel 200. FIG. 2 is a schematic representation of the actuator assembly 100 of the steer-by-wire steering system 900. The actuator assembly 100 comprises an electro-mechanical actuator 104 independently mounted to the vehicle, a crank arm 106 connected to the electro-mechanical actuator 104, a steering arm 110 connected to the first road wheel 200, and a tie rod 108 having a first end 108a thereof connected to the crank arm 106 and a second end 108b thereof connected to the steering arm 110. The electro mechanical actuator 104, in response to the steering signal 300a, originating from the controller 300, is operative to rotate the crank arm 106 clockwise or counterclockwise about a first axis(not shown), thus producing a force acting through the tie rod 108 so as to rotate the steering arm 110 and the first road wheel 200, also clockwise or counterclockwise, about a second axis(not shown) to a desired position. In FIG. 4 a back-up system 700 is shown connected to the crank arm 106 by way of a linking bar 706.

With reference to FIG. 3, therein depicted is a schematic representation of the steer-by-wire steering system 900 comprising a plurality of actuator assemblies 100a, 100b connected to the first controller 300 and a plurality of road wheels 200, 400. The steer-by-wire steering system 900 further comprises a cross link apparatus 600. The cross link apparatus 600 includes a first segment 600a thereof connected to a first crank arm 106a and a linking sleeve 600c; and a second segment 600b thereof connected to a second crank arm 106b and the linking sleeve 600c. The cross link apparatus 600 is operative to transfer steering responsibility from the first actuator assembly 100a to the second actuator assembly 100b or vice-versa in the event that any of the actuator assemblies 100a, 100b becomes inoperative.

The linking sleeve 600c is adapted to allow first cross-link segment 600a and second cross-link segment 600b to translate side to side independent of one another until a maximum difference in steering angle has occurred between the road wheels. This may be accomplished by slideably mounting the segments 600a, 600b to the linking sleeve 600c. This permits the wheels to be slightly out of alignment with one another, which is desirable to correct for the Ackerman angle (the difference in turning radius between the inside and outside front wheels during a turn). The linking sleeve is optional, but will be desired as a safety precaution against system failures that might cause the front wheels to go dangerously out of alignment with one another at speed. It is anticipated that the linking sleeve will generally allow the road wheels to be no more than 10 degrees out of alignment with one another, preferably 5 degrees.

Reference will now be had to FIG. 4. Therein depicted is a generalized schematic representation of the back-up system 700 of FIG. 2. The back-up system 700 comprises a bi-directional hydraulic cylinder 704 connected to the crank arm 106 of the electro mechanical actuator assembly 100 by way of a linking bar 706. The back-up system 700 further comprises a bi-directional hydraulic valve 702 connected to the hydraulic cylinder 704 by way of a first pair of hydraulic lines 702a, 702b. Still further, the back-up system 700 comprises a hydraulic pump 710 connected to the hydraulic valve 702 by way of a second pair of hydraulic lines 71a, 710b, and a second controller 708 connected to the hydraulic valve 702 by way of a signal line 702c. The back-up system 700 is capable of assuming operative command of the steer-by-wire steering system 900.

It will be apparent to one skilled in the art that modifications may be made to the above described invention. The appended claims are therefore intended to embrace all such claims that fall within the true spirit and intent of the invention.

What is claimed is:

1. A steer-by-wire steering system for steering a set of road wheels, the system comprising:

a first controller;

at least one actuator assembly connected to the controller and to at least one wheel of the set of road wheels; and an hydraulic backup assembly connected to the at least one actuator assembly, wherein the at least one actuator assembly comprises:

an electro-mechanical actuator connected to the first controller;

a crank arm connected to the electro mechanical actuator;

a steering arm connected to the at least one wheel of the set of road wheels; and a tie rod having a first end thereof connected to the crank arm and a second end thereof connected to the steering arm.

2. The invention as set forth in claim 1, wherein the electro-mechanical actuator, in response to a steering signal from the controller, is operative to rotate the crank arm producing thereby a force through the tie rod so as to rotate the steering arm and the at least one road wheel to a desired position.

3. A steer-by-wire steering system for steering a set of road wheels, the system comprising:
   a first controller;
   at least one actuator assembly connected to the controller and to at least one wheel of the set of road wheels;
   an hydraulic backup assembly connected to the at least one actuator assembly, wherein the at least one actuator assembly further comprises a plurality of actuator assemblies connected to the first controller and to at least one wheel of the set of road wheels; and
   a cross link system, comprising:
      a first segment thereof connected to a first actuator assembly of the plurality of actuator assemblies; and
      a second segment thereof connected to a second actuator assembly of the plurality of actuator assemblies.

4. The invention as set forth in claim 3, wherein the cross link system further comprises a transfer apparatus operative to transfer steering capability from the first actuator assembly of the plurality of actuator assemblies to the second actuator assembly of the plurality of actuator assemblies.

5. The invention of claim 3, wherein said first and second segments are slideably connected to said actuator assemblies.

6. A steer-by-wire steering system comprising:
   a first controller;
   a plurality of actuator assemblies independently mounted to a vehicle and connected to a road wheel, said actuator assemblies being in operable communication with said controller, wherein at least one of the plurality of actuator assemblies comprises:
      an electro mechanical actuator;
      a crank arm connected to the electro mechanical actuator;
      a tie rod connected to the crank arm; and
      a steering arm connected to the tie rod and to the road wheel; and
   a back-up assembly connected to at least one actuator assembly of the plurality of actuator assemblies, wherein the back-up assembly further comprises:
      a cylinder connected to the crank arm via a linking bar;
      a valve connected to the cylinder;
      a pump connected to the valve; and
      a second controller connected to the valve.

7. A steer-by-wire steering system as claimed in claim 6 wherein the electro mechanical actuator, in response to a steering signal from the controller, is operative to rotate the crank arm producing thereby a force through the tie rod so as to rotate the steering arm and the road wheel to a desired position.

8. A steer-by-wire steering system as claimed in claim 6 further comprising:
   a cross link system, comprising:
      a first segment connected to a first actuator assembly of the plurality of actuator assemblies; and
      a second segment connected to a second actuator assembly of the plurality of actuator assemblies.

9. A steer-by-wire steering system as claimed in claim 8 wherein the cross link system further comprises a transfer apparatus operative to transfer steering capability from the first actuator assembly of the plurality of actuator assemblies to cause movement of the second actuator assembly of the plurality of actuator assemblies.

10. A steer-by-wire steering system as claimed in claim 8 wherein said first and second segments are slideably connected to said actuator assemblies.

11. A steer-by-wire steering system as claimed in claim 6 wherein the back-up assembly is a hydraulic assembly.

12. A steer-by-wire steering system for steering a set of steerable members, comprising:
   a first controller;
   a first electro mechanical actuator connected to said first controller, said first electro mechanical actuator being configured to rotate a first crank arm in response to first signals from said first controller, said first crank arm being adapted to adjust a position of a first member of the set of steerable members;
   a second electro mechanical actuator connected to said first controller, said second electro-mechanical actuator being configured to rotate a second crank arm in response to second signals from said first controller, said second crank arm being adapted to adjust a position of a second member of the set of steerable members;
   a first back-up assembly securing said first and second crank arms to one another, said first back-up assembly being operative to transfer steering responsibility from said first electro-mechanical actuator to said second electro mechanical actuator or vice-versa in the event that either of said first and second electro mechanical actuators become inoperative;
   a second controller; and
   a second back-up assembly secured to said first crank arm, said second back-up assembly being configured to assume steering responsibility from said first and second electro mechanical actuators in response to third signals from said second controller in the event that said first controller or both of said first and second electro mechanical actuators become inoperative.

13. The steering system as in claim 12, wherein said first back-up assembly comprises:
   a linking sleeve;
   a first segment connected at one end to said first crank arm and at another end to said linking sleeve; and
   a second segment connected at one end to said second crank arm and At another end to said linking sleeve.

14. The steering system as in claim 13, wherein said linking sleeve is adapted to allow said first and second segments to translate side to side independent of one another until a maximum difference in steering angle has-occurred between said first and second members.

15. steering system as in claim 14, wherein said maximum difference in steering angle is no more than about 10 degrees.

16. The steering system as in claim 12, wherein said second back-up assembly comprises:
   a bi-directional cylinder connected to said first crank arm via a linking bar;
   a valve connected to said cylinder; and
   a pump connected to said valve, said second controller being connected to said valve to selectively open and close said valve.

17. The steering system as in claim 16, wherein said bi-directional cylinder is an hydraulic bi-directional cylinder.

18. The steering system as in claim 12, wherein said first steerable member is a first road wheel, and said second steerable member is a second road wheel.

* * * * *